United States Patent
Ishitsuka et al.

(10) Patent No.: US 10,640,843 B2
(45) Date of Patent: May 5, 2020

(54) HIGH STRENGTH ELECTRIC RESISTANCE WELDED STEEL PIPE AND METHOD FOR PRODUCING HIGH STRENGTH ELECTRIC RESISTANCE WELDED STEEL PIPE

(71) Applicant: NIPPON STEEL & SUMITOMO METAL CORPORATION, Tokyo (JP)

(72) Inventors: Tetsuo Ishitsuka, Tokyo (JP); Shuji Iwamoto, Tokyo (JP); Takashi Tsusue, Tokyo (JP); Shunichi Kobayashi, Tokyo (JP); Osamu Yoshida, Tokyo (JP); Hideto Kawano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 178 days.

(21) Appl. No.: 15/561,337

(22) PCT Filed: Feb. 15, 2016

(86) PCT No.: PCT/JP2016/054323
§ 371 (c)(1),
(2) Date: Sep. 25, 2017

(87) PCT Pub. No.: WO2016/185741
PCT Pub. Date: Nov. 24, 2016

(65) Prior Publication Data
US 2018/0105893 A1 Apr. 19, 2018

(30) Foreign Application Priority Data
May 20, 2015 (JP) .................................. 2015-102920

(51) Int. Cl.
*C21D 6/00* (2006.01)
*C21D 8/10* (2006.01)
(Continued)

(52) U.S. Cl.
CPC .............. *C21D 9/505* (2013.01); *B21B 1/026* (2013.01); *B21B 1/22* (2013.01); *B23K 11/0873* (2013.01);
(Continued)

(58) Field of Classification Search
CPC C21D 2211/005; C21D 8/0205; C21D 8/105; C21D 8/02; C21D 8/0226;
(Continued)

(56) References Cited

U.S. PATENT DOCUMENTS

2004/0187982 A1 9/2004 Nakata et al.
2005/0183798 A1* 8/2005 Kobayashi ........... C21D 8/0226
148/593

(Continued)

FOREIGN PATENT DOCUMENTS

EP 1462535 A1 9/2004
EP 2295615 A1 3/2011
(Continued)

OTHER PUBLICATIONS

English translation of the International Search Report (form PCT/ISA/210), dated Apr. 5, 2016, for corresponding International Application No. PCT/JP2016/054323.

(Continued)

*Primary Examiner* — Michael E. La Villa
(74) *Attorney, Agent, or Firm* — Birch, Stewart, Kolasch & Birch, LLP

(57) ABSTRACT

Electric resistance welded steel pipe securing the high strength and high toughness demanded from oil well pipe in recent years. The metal structure in a region having a width of 0.5 mm in both the thickness directions from a reference point, when using a point defined as a point ¼ of the thickness in the thickness direction from the surface in the base material part of the steel as the reference point, consists (Continued)

of polygonal ferrite: 10 area % or less and a balance: bainitic ferrite. The thickness is 15 mm or more.

7 Claims, 2 Drawing Sheets

(51) Int. Cl.
| | |
|---|---|
| C21D 9/50 | (2006.01) |
| C21D 9/08 | (2006.01) |
| C22C 38/58 | (2006.01) |
| C22C 38/50 | (2006.01) |
| C22C 38/48 | (2006.01) |
| C22C 38/46 | (2006.01) |
| C22C 38/44 | (2006.01) |
| C22C 38/42 | (2006.01) |
| C22C 38/06 | (2006.01) |
| C22C 38/02 | (2006.01) |
| C22C 38/00 | (2006.01) |
| B21B 1/02 | (2006.01) |
| B21B 1/22 | (2006.01) |
| F16L 9/17 | (2006.01) |
| B23K 11/087 | (2006.01) |
| C21D 8/02 | (2006.01) |
| C22C 38/16 | (2006.01) |
| C22C 38/08 | (2006.01) |
| B23K 11/16 | (2006.01) |
| C22C 38/04 | (2006.01) |
| C22C 38/14 | (2006.01) |
| C21D 9/46 | (2006.01) |
| C22C 38/12 | (2006.01) |
| C22C 38/26 | (2006.01) |
| C22C 38/18 | (2006.01) |
| C22C 38/20 | (2006.01) |
| C22C 38/40 | (2006.01) |
| C22C 38/22 | (2006.01) |
| C22C 38/28 | (2006.01) |
| F16L 9/16 | (2006.01) |
| F16L 9/00 | (2006.01) |
| B32B 15/00 | (2006.01) |
| B32B 1/08 | (2006.01) |
| B23K 103/04 | (2006.01) |
| B23K 101/06 | (2006.01) |

(52) U.S. Cl.
CPC ............... *B23K 11/16* (2013.01); *B32B 1/08* (2013.01); *B32B 15/00* (2013.01); *C21D 6/001* (2013.01); *C21D 6/004* (2013.01); *C21D 6/005* (2013.01); *C21D 6/008* (2013.01); *C21D 8/02* (2013.01); *C21D 8/0205* (2013.01); *C21D 8/0226* (2013.01); *C21D 8/0263* (2013.01); *C21D 8/105* (2013.01); *C21D 9/08* (2013.01); *C21D 9/085* (2013.01); *C21D 9/46* (2013.01); *C21D 9/50* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/26* (2013.01); *C22C 38/28* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *F16L 9/00* (2013.01); *F16L 9/16* (2013.01); *F16L 9/165* (2013.01); *F16L 9/17* (2013.01); *B21B 2001/028* (2013.01); *B21B 2001/225* (2013.01); *B23K 2101/06* (2018.08); *B23K 2103/04* (2018.08); *C21D 2211/005* (2013.01); *Y10T 428/12799* (2015.01); *Y10T 428/12951* (2015.01); *Y10T 428/12972* (2015.01); *Y10T 428/13* (2015.01); *Y10T 428/26* (2015.01)

(58) Field of Classification Search
CPC ........ C21D 6/008; C21D 6/005; C21D 6/004; C21D 6/001; C21D 9/08; C21D 9/50; C21D 9/085; C21D 9/46; C21D 9/505; C21D 8/0263; B23K 2103/04; B23K 11/0873; B23K 11/16; B23K 2001/225; B23K 2001/028; B23K 2101/06; B21B 1/22; B21B 1/026; C22C 38/50; C22C 38/46; C22C 38/00; C22C 38/16; C22C 38/58; C22C 38/48; C22C 38/44; C22C 38/42; C22C 38/06; C22C 38/02; C22C 38/005; C22C 38/002; C22C 38/001; C22C 38/04; C22C 38/08; C22C 38/12; C22C 38/14; C22C 38/18; C22C 38/20; C22C 38/22; C22C 38/26; C22C 38/28; C22C 38/40; F16L 9/17; F16L 9/16; F16L 9/165; F16L 9/00; B32B 15/00; B32B 1/08; Y10T 428/12951; Y10T 428/12972; Y10T 428/13; Y10T 428/12799; Y10T 428/26

See application file for complete search history.

(56) References Cited

U.S. PATENT DOCUMENTS

| | | |
|---|---|---|
| 2010/0074794 A1 | 3/2010 | Ahn et al. |
| 2011/0284137 A1 | 11/2011 | Kami et al. |
| 2013/0092280 A1 | 4/2013 | Sawamura et al. |
| 2016/0153063 A1 | 6/2016 | Goto et al. |

FOREIGN PATENT DOCUMENTS

| | | |
|---|---|---|
| JP | 7-102321 A | 4/1995 |
| JP | 2004-315957 A | 11/2004 |
| JP | 2007-254797 A | 10/2007 |
| JP | 2010-509494 A | 3/2010 |
| JP | 2010-196156 A | 9/2010 |
| JP | 2010-196163 A | 9/2010 |
| JP | 2015-17287 A | 1/2015 |
| WO | WO2012/144248 A1 | 10/2012 |
| WO | WO 2015/004901 A1 | 1/2015 |

OTHER PUBLICATIONS

Extended European Search Report dated Nov. 7, 2018, for corresponding European Application No. 16796136.6.
Office Action dated Nov. 28, 2019 in corresponding European Patent Application No. 16 796 136.6.

\* cited by examiner

HIGH STRENGTH ELECTRIC RESISTANCE WELDED STEEL PIPE AND METHOD FOR PRODUCING HIGH STRENGTH ELECTRIC RESISTANCE WELDED STEEL PIPE

TECHNICAL FIELD

The present invention relates to a high strength electric resistance welded steel pipe, more particularly relates to a high strength electric resistance welded steel pipe which achieves both strength and toughness at a high level. Further, the present invention also relates to a method of producing steel plate for use in such a steel pipe and a method of producing such a steel pipe.

BACKGROUND ART

In recent years, the drilling depth of oil wells and gas wells has tended to increase more and more. It is strongly required to increase the strength of oil well pipe in order to increase the collapse strength of casings and the like. Recently, in order to reduce the drilling costs, there has been increasing demand for an electric resistance welded steel pipe which is high in strength and which does not undergo heat treatment on the entire steel pipe after pipemaking.

In order to increase the strength of the steel material, it is effective to include a sufficient amount of carbon. An electric resistance welded steel pipe having a carbon content of 0.25 mass % or more and having a tensile strength of 800 MPa or more as formed has been proposed (see PLT 1 (Japanese Patent Publication No. 07-102321A)). However, if including a large amount of carbon to increase the strength, the toughness of the steel material may decrease.

Further, in order to increase the strength of the steel material, it is also effective to use a martensite or bainite or other hard metal structure comprising a low temperature transformation structure. Further, in the process of producing the electric resistance welded steel pipe, the pipe is shaped and sized etc., so work hardening by cold working can be used for improving strength. An electric resistance welded steel pipe having a tensile strength of 862 MPa or more as formed by combining such structure strengthening and work hardening has been proposed (see PLT 2 (International Publication No. 2012/144248)).

SUMMARY OF INVENTION

Technical Problem

In the technique of PLT 2, when producing hot-rolled steel plate for use as the material (base material) of an electric resistance welded steel pipe, the coiling temperature is lowered to make the metal structure bainite and secure the strength, but this is merely realized by the small thickness and size of the steel plate. As opposed to this, in the case of producing steel plate having a larger plate thickness and a larger plate width, it is preferable to increase the coiling temperature from the viewpoint of manufacturability, but if the coiling temperature is raised, it becomes difficult to secure both strength and toughness of the steel plate at a high level.

In addition, in the case of reducing the amount of carbon of the steel plate in order to improve the toughness and thereby secure the strength, a low carbon component system (low C—Ti—B system) to which titanium and boron are added is advantageous. However, in order to increase the collapse strength of oil well pipe, not only higher strength but also greater thickness is demanded. In the case of increasing the thickness of a low carbon component system (low C—Ti—B system) steel material to which titanium and boron have been added, the coiling temperature after hot rolling becomes high, so the strength and toughness of the steel plate are liable to fall.

As a result of intensive studies, the present inventors obtained the finding that when producing a thick wall oil well pipe, if increasing the plate thickness of the steel plate, even if a component system of a (low C—Ti—B type), it is not possible to achieve both strength and toughness at a high level. In addition, they obtained the finding that the above tendency due to an increase in plate thickness is remarkable especially in hot rolled steel plate for electric resistance welded steel pipes having a plate thickness of 15 mm or more.

The present invention was made in view of the above circumstances and has as an object thereof to provide a high strength electric resistance welded steel pipe which can achieve both the strength and toughness demanded from an oil well pipe at a high level.

Further, the present invention also has as its object to provide a method for producing a steel plate for a high strength electric resistance welded steel pipe used in the above high strength electric resistance welded steel pipe and a method for producing the high strength electric resistance welded steel pipe.

Solution to Problem

The present inventors extensively studied high strength electric resistance welded steel pipes capable of achieving the strength and toughness demanded from an oil well pipe at a high level. As a result, the present inventors obtained the findings that by (I) making the chemical composition of the hot rolled steel plate used for manufacture of the electric resistance welded steel pipe one including the element Mo improving the hardenability and, further, giving rise to the effect of precipitation strengthening (low C—Ni—Cu—Mo system) and (II) suitably controlling the cooling rate and coiling temperature of the hot-rolled steel plate after the end of hot rolling to obtain hot-rolled steel plate for electric resistance welded steel pipe having a metal structure excellent in mechanical properties (strength and toughness), (III) it is possible to obtain high-strength electric resistance welded steel pipe having excellent strength and toughness even if the thickness of the electric resistance welded steel pipe is a predetermined value or more. Note that, they also obtained the finding that (IV) if suitably heat treating the weld zone after forming the pipe using the above hot-rolled steel plate (base steel plate), excellent strength and toughness similar to the steel pipe part can be secured in the weld zone.

The present invention was made based of the above findings and has as its gist the following:

(1) High strength electric resistance welded steel pipe characterized by having a chemical composition consisting of, by mass %,
C: 0.040 to 0.070%,
Si: 0.10 to 0.50%,
Mn: 1.60 to 2.00%,
Nb: 0.020 to 0.080%,
V: 0.060% or less,
Ti: 0.010 to 0.025%,
Mo: 0.20 to 0.40%, Ni: 0.10 to 0.50%,
Al: 0.050% or less,
3 Mo %+Ni %: more than 1.00%, and
a balance of Fe and unavoidable impurities, wherein when using a point defined as a point ¼ of the thickness in the thickness direction from the surface in the base material part of the steel pipe as a reference point, the metal structure in a region having a width of 0.5 mm in both the thickness directions from the reference point as a center consists of polygonal ferrite: 10 area % or less and a balance of bainitic ferrite, and
a thickness is 15.0 to 19.8 mm.

(2) The high strength electric resistance welded steel pipe according to (1) wherein the chemical composition further comprises, by mass %
P: 0.030% or less,
S: 0.004% or less,
N: 0.006% or less, and
O: 0.004% or less.

(3) The high strength electric resistance welded steel pipe according to (1) or (2) wherein the chemical composition further comprises, by mass %, one or two or more of
Cu: 0.10 to 0.50%,
Cr: 0.05 to 0.50%
Ca: 0.0005 to 0.0040% and
REM: 0.0005 to 0.0050%.

(4) The high strength electric resistance welded steel pipe according to (3) wherein (3Mo %+Ni %+Cu %) is more than 1.20%.

(5) The high strength electric resistance welded steel pipe according to any one of the above (1) to (4), wherein the polygonal ferrite has an average particle diameter of 20 μm or less.

(6) The high strength electric resistance welded steel pipe according to any one of (1) to (5), wherein the mechanical properties of the metal structure are such that the tensile strength in the axial direction exceeds 725 MPa, the yield strength in the axial direction is from 655 to 758 MPa, and the Charpy absorbed energy in the circumferential direction at 0° C. is 22 J or more.

(7) A method for producing steel plate for high strength electric resistance welded steel pipe use comprising hot rolling hot-rolled steel plate having the chemical composition of any one of the above (1) to (3) at 790° C. or more, cooling it at an average cooling rate of 8 to 15° C./sec, coiling it at 500 to 630° C., and cooling it at a cooling rate exceeding 5° C./sec at the beginning of transformation.

(8) The method for producing steel plate for high strength electric resistance welded steel pipe use according to the (7), wherein the temperature at the start of the transformation is less than 665° C.

(9) The method for producing steel plate for high strength electric resistance welded steel pipe use according to the (7) or (8), wherein the hot-rolled steel plate is hot-rolled steel plate obtained by heating a slab and hot rolling it with a cumulative rolling reduction rate at 950° C. or less of 50% or more.

(10) A method of producing high strength electric resistance welded steel pipe comprising forming steel plate produced by the method according to any one of the above (7) to (9) into a tube, welding end portions of the steel plate by electric resistance welding, heating the outer surface of the weld zone to 950 to 1050° C., and cooling the inner surface of the weld zone at a cooling rate of 8° C./sec or more to a cooling stop temperature of the outer surface of 600 to 450° C. Note that after producing the electric resistance welded steel pipe in this way, it is possible to suitable size it.

Advantageous Effects of the Invention

In the high-strength steel pipe according to the present invention, improvements have been made on the chemical composition, the metal structure, and the thickness of the steel pipe. As a result, according to the high-strength steel pipe of the present invention, sufficient strength and toughness for use as oil well pipe can be realized.

DESCRIPTION OF EMBODIMENTS

Figure 1:
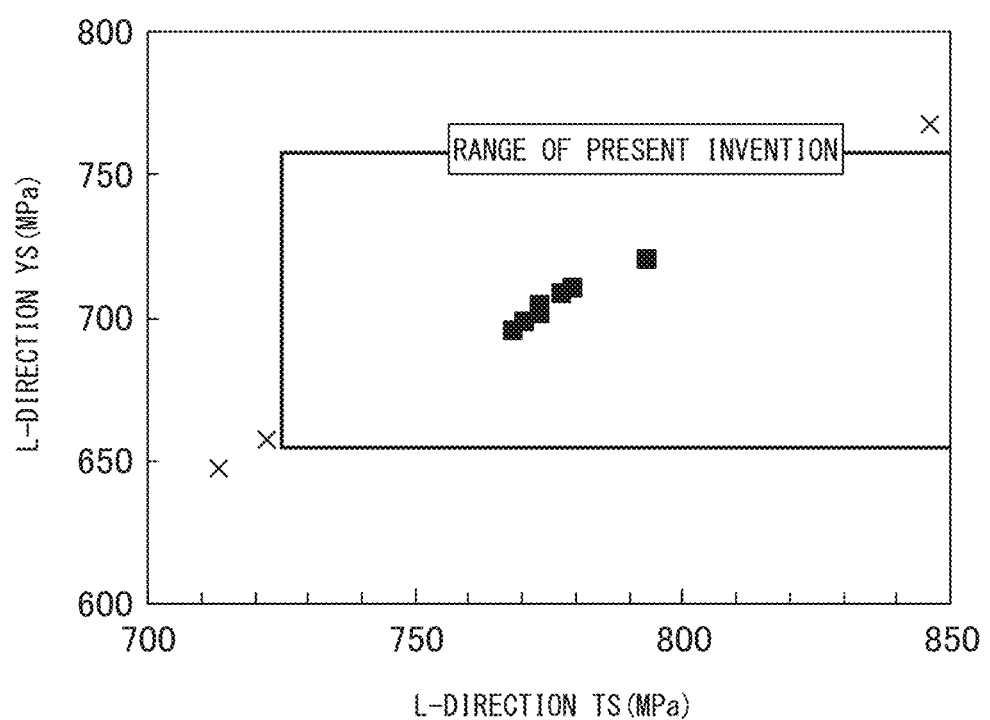
FIG. 1 is a graph showing a relationship between a tensile strength TS in the axial direction of a steel pipe and a yield strength YS.

Below, embodiments of a high strength electric resistance welded steel pipe, a method of producing a steel plate for a high strength electric resistance welded steel pipe, and a method of producing high strength electric resistance welded steel pipe according to the present invention will be described in detail. Note that, "%" shown below means "mass %" unless otherwise specified. Further, "L-direction" means the "axial direction of steel pipe", while "C-direction" means the "circumferential direction of steel pipe".

High Strength Electric Resistance Welded Steel Pipe and Steel Plate for High Strength Electric Resistance Welded Steel Pipe use Chemical Composition First, the reasons for limitation of the chemical composition of the high strength electric resistance welded steel pipe according to the present embodiment (below, sometimes simply referred to as "the present electric resistance welded steel pipe") and the steel plate for high strength electric resistance welded steel pipe use according to this embodiment (below, sometimes simply referred to as "the present steel plate") will be explained.

C: 0.040 to 0.070%

C is an element which enhances the hardenability of the present steel plate and increases its strength. If it is less than 0.040%, the required strength cannot be obtained, so C is made 0.040% or more. It is preferably 0.045% or more. On the other hand, if it exceeds 0.070%, the toughness of the steel plate and the toughness of the weld heat affected zone of the steel pipe are lowered, so C is made 0.070% or less. It is preferably 0.065% or less.

Si: 0.10 to 0.50%

Besides being a deoxidizing element, Si is an element contributing to improvement in strength. If it is less than 0.10%, the effect of addition cannot be sufficiently obtained, so Si is made 0.10% or more. It is preferably 0.20% or more. On the other hand, if it exceeds 0.50%, Si-containing oxides are formed at the time of electric resistance welding, the quality of the weld zone falls, and the toughness of the weld heat affected zone is lowered, so Si is 0.50% or less. It is preferably 0.40% or less.

Mn: 1.60 to 2.00%

Mn is an element which enhances the hardenability of the present steel plate, contributes to the improvement of its strength, and forms MnS to fix S and suppress cracking of the slab during casting. If it is less than 1.60%, since the effect of addition cannot be sufficiently obtained, Mn is made 1.60% or more. It is preferably 1.70% or more. On the other hand, if it exceeds 2.00%, the resistance to sulfide stress cracking of the present steel plate decreases, so Mn is made 2.00% or less. It is preferably 1.85% or less.

Nb: 0.020 to 0.080%

Nb is an element which forms fine carbonitrides and (i) precipitates as NbC at the coiling temperature after hot rolling to improve the strength of the present steel plate. Further, Nb is an element which (ii) suppresses grain boundary migration of austenite to suppress coarsening of austenite grains and recrystallization, enables rolling in the austenite non-recrystallization temperature region at hot finish rolling and prevents the formation of coarse grains immediately above the austenite non-recrystallization temperature range.

If it is less than 0.020%, the effect of addition cannot be sufficiently obtained, so Nb is made 0.020% or more. It is preferably 0.025% or more. On the other hand, if it exceeds 0.080%, sometimes the strength of the present steel plate excessively rises, the rolling load during rolling increases, and finish rolling becomes difficult, so Nb is made 0.080% or less. It is preferably 0.050% or less.

V: 0.060% or Less

V is an element which forms fine carbonitrides to improve the strength of the present steel plate without impairing weldability. However, when the content exceeds 0.060%, carbonitrides are produced in a large amount, the strength of the steel plate increases, and the toughness may decrease. Therefore, V is made 0.060% or less. It is preferably 0.030% or less. The lower limit value is not particularly limited, but it is preferably 0.010% or more in order to sufficiently obtain the effect of addition.

Ti: 0.010 to 0.025%

Ti is an element that forms nitrides to fix N and prevent cracking of the slab during casting. If it is less than 0.010%, the effect of addition cannot be sufficiently obtained, so Ti is made 0.010% or more. It is preferably 0.013% or more. On the other hand, when it exceeds 0.025%, carbonitrides are produced in large amount, and the toughness of the steel plate and the toughness of the weld heat affected zone are lowered. Therefore, Ti is made 0.025% or less. It is preferably 0.022% or less.

Mo: 0.20 to 0.40%

Mo is an element which improves the hardenability and also forms carbonitrides to contribute to the improvement of the strength of the present steel plate. If it is less than 0.20%, since it cannot compensate for the decrease in strength due to the reduction of the C content, so Mo is made 0.20% or more. It is preferably at least 0.24%. On the other hand, when it exceeds 0.40%, carbides are produced in large amount and the toughness is lowered, so Mo is made 0.40% or less. It is preferably 0.36% or less.

Ni: 0.10 to 0.50%

Ni is an element which contributes to improving the toughness of the present steel plate and also improves hardenability. If it is less than 0.10%, the effect of addition cannot be sufficiently obtained, so Ni is made 0.10% or more. It is preferably 0.20% or more. On the other hand, if it exceeds 0.50%, the weldability of the steel plate decreases and the material cost increases, so Ni is made 0.50% or less. It is preferably 0.45% or less.

Al: 0.050% or Less

Al is an element that functions as a deoxidizing agent. However, when the content exceeds 0.050%, oxides are formed in a large amount and the cleanliness of the steel pipe is hindered, so Al is made 0.050% or less. It is preferably 0.030% or less. The lower limit is not particularly limited, but in order to sufficiently obtain the deoxidizing effect, 0.005% or more is preferable. It is more preferably 0.010% or more.

3 Mo %+Ni %: More than 1.00%

In the present embodiment, a required metal structure (polygonal ferrite: 10 area %, balance: bainitic ferrite) is formed. This metal structure and the chemical composition combine to impart the required mechanical properties to the present electric resistance welded steel pipe (L-direction tensile strength: greater than 725 MPa, L-direction yield strength: 655 to 758 MPa, C-direction Charpy absorbed energy at 0° C.: 22J or more). Therefore, in the present embodiment, the sum of the ratio of the strength improving element Mo and the ratio of the toughness improving element Ni is employed as an index for realizing the above mechanical properties for the chemical composition.

Mo is an important element compensating for the reduction in strength due to the low C in the present electric resistance welded steel pipe by structural strengthening and precipitation strengthening due to improvement of the hardenability, so is evaluated as 3 Mo and incorporated into the above index. Further, in the present electric resistance welded steel pipe, 3 Mo %+Ni % is made over 1.00%.

When 3 Mo %+Ni % is 1.00% or less, it becomes difficult to form a required metal structure, so 3 Mo %+Ni % is made more than 1.00. Preferably, it is 1.20% or more. The upper limit value is determined by the upper limit value of each element, so it is not limited.

In addition to the above elements, the chemical compositions of the present electric resistance welded steel pipe and the present steel plate may include at least one of P: 0.030%, S: 0.004% or less, N: 0.006% or less, O: 0.004% or less, and Cu: 0.10 to 0.50%.

P: 0.030% or Less

P is an impurity element and is an element that segregates at grain boundaries and increases resistance to sulfide stress cracking. When it exceeds 0.030%, sulfide stress cracking resistance appears conspicuously, so P is made 0.030% or less. It is preferably 0.015% or less. The lower limit includes 0%, however, if P is reduced to less than 0.005%, the manufacturing cost will be dramatically increased, so the practical lower limit is 0.005% for practical steel plate and practical steel pipe.

S: 0.004% or Less

S is an impurity element and is an element which lowers toughness and forms MnS to increase resistance to sulfide stress cracking. If it exceeds 0.004%, a decrease in the toughness of the steel plate and sulfide stress cracking resistance are remarkably exhibited, so S is made 0.004% or less. It is preferably 0.002% or less. The lower limit includes 0%. However, when S is reduced to less than 0.0005%, the manufacturing cost is greatly increased, so 0.0005% is a practical lower limit value for practical steel plate and practical steel pipe.

N: 0.006% or Less

N is an impurity element and is an element which reduces the formability of the steel plate during pipe formation due to aging. If it exceeds 0.006%, the formability of the steel plate remarkably falls, so N is made 0.006% or less. It is preferably 0.003% or less. The lower limit includes 0%, but if N is reduced to less than 0.0005%, the manufacturing cost will increase greatly, so 0.0005% is a practical lower limit for practical steel plate and practical steel pipe.

O: 0.004% or Less

O is an element which forms oxides which cause welding defects at the weld zone of the present electric resistance welded steel pipe and which decreases the toughness of the weld zone and increases the resistance to sulfide stress cracking. If it exceeds 0.004%, the toughness of the weld zone is remarkably lowered and the sulfide stress cracking resistance is remarkably increased, so O is made 0.004% or less. It is preferably 0.002% or less. The lower limit includes 0%, but if O is reduced to less than 0.0005%, the manufacturing cost will be greatly increased, so 0.0005% is a practical lower limit value for practical steel plate and practical steel pipe.

Cu: 0.10 to 0.50%

In addition to improving hardenability, Cu is an element contributing to the improvement of the strength of the present steel plate by solid solution strengthening or precipitation strengthening. If it is less than 0.10%, the effect of addition cannot be sufficiently obtained, so Cu is made 0.10% or more. It is preferably 0.15% or more. On the other hand, when it exceeds 0.50%, the hot workability deteriorates, so Cu is made 0.50% or less. It is preferably 0.45% or less.

Note that in the present embodiment, even in the case of containing Cu, a required metal structure (polygonal ferrite: 10 area %, balance: bainitic ferrite) is formed. This metal structure and the chemical composition combine to impart the mechanical properties required from the present electric resistance welded steel pipe (L-direction tensile strength: over 725 MPa, L-direction yield strength: 655 to 758 MPa, C-direction Charpy absorbed energy at 0° C.: 22J or more) to the electric resistance welded steel pipe. Therefore, in the present embodiment, the sum of the ratio of the strength improving elements Mo and Cu and the ratio of the toughness improving element Ni is employed as an index for realizing the above mechanical properties for the chemical composition. That is, in the case where Cu is contained, (3 Mo %+Ni %+Cu %) is made more than 1.20%.

Cu is an important element compensating for the reduction in strength due to low C in the present electric resistance welded steel pipe by the structural strengthening and the solid solution strengthening or precipitation strengthening and is incorporated into the above index. Further, in the present electric resistance welded steel pipe containing Cu, 3 Mo %+Ni %+Cu % is made more than 1.20%.

When 3 Mo %+Ni %+Cu % is 1.20% or less, it is difficult to form the required metal structure, so 3 Mo %+Ni %+Cu % is made more than 1.20. It is preferably 1.40% or more. The upper limit value is determined by the upper limit of each element, so it is not limited.

The electric resistance welded steel pipe according to the present embodiment and the steel plate for an electric resistance welded steel pipe according to the present embodiment may contain, in addition to the above elements, to an extent not detracting from the mechanical characteristics, at least one of Ca: 0.0040% or less, Cr: 0.50% or less, and REM: 0.0050% or less.

Ca: 0.0040% or Less

Ca is an element that spheroidizes expanded coarse sulfides and contributes to the improvement of toughness. However, when it exceeds 0.0040%, the cleanliness of the steel pipe decreases, so Ca is preferably 0.0040% or less. It is more preferably 0.0025% or less. The lower limit includes 0%, but in order to sufficiently obtain the effect of addition, 0.0005% or more is preferable.

Cr: 0.50% or Less

Cr is an element which enhances the hardenability and contributes to the improvement of the strength of the present steel plate. However, when it exceeds 0.50%, since welding defects may be induced at the time of (electric seam) welding, Cr is preferably 0.50% or less. It is more preferably 0.30% or less. The lower limit includes 0%, but in order to obtain the effect of addition, 0.05% or more is preferable.

REM: 0.0050% or Less

REM is an element that spheroidizes expanded coarse sulfide to contribute to improvement of toughness. However, when it exceeds 0.0050%, the cleanliness of the steel pipe decreases, so that REM is preferably 0.0050% or less. It is more preferably 0.0035% or less. The lower limit includes 0%, but in order to sufficiently obtain the effect of addition, 0.0005% or more is preferable.

Above, the chemical compositions of the present electric resistance welded steel pipe and the present steel plate were described above, but the balances of the chemical compositions are Fe and unavoidable impurities. Here, "unavoidable impurities" are components that are contained in raw materials or that are mixed in during the course of manufacturing and that are not intentionally contained in the steel. In addition, the unavoidable impurities specifically include Sb, Sn, W, Co, As, Mg, Pb, Bi, B, and H.

Metal Structure

Next, the reasons for limiting the metal structures of the high strength electric resistance welded steel pipe according to the present embodiment and the steel plate for high strength electric resistance welded steel pipe use according to the present embodiment will be described.

In the present electric resistance welded steel pipe, to reliably secure mechanical properties of an L-direction tensile strength of more than 725 MPa and an L-direction yield strength of 655 to 758 MPa and a C-direction Charpy absorbed energy at 0° C. of 22 J or more, the metal structure is made a metal structure of polygonal ferrite: 10 area % or less and a balance of bainitic ferrite.

Here, in the present embodiment, "polygonal ferrite" means a metal structure in which the Vicker's hardness Hv is in the range shown by the following formula (1):

$$Hv=\alpha+430\times[C\%](200\leq\alpha\leq240) \quad (1)$$

Further, in the present electric resistance welded steel pipe, by limiting the composition by making (3 Mo+Ni %) over 1.00% or making (3 Mo+Ni %+Cu %) over 1.20%, it is possible to stably form the above metal structure and secure an L-direction tensile strength of more than 725 MPa, an L-direction yield strength of 655 to 758 MPa, and a C-direction Charpy absorbed energy at 0° C. of 22 J or more. The reasons for this will be described later.

When the polygonal ferrite in the metal structure of the present electric resistance welded steel pipe exceeds 10 area %, it becomes difficult to support a tensile strength exceeding 725 MPa, so polygonal ferrite is made 10 area % or less. Preferably, it is 5 area % or less. The area percentage of polygonal ferrite fluctuates under cooling conditions, so the lower limit of the area % of polygonal ferrite is not limited.

The average particle diameter of the polygonal ferrite is preferably 20 μm or less. If the average particle diameter of the polygonal ferrite exceeds 20 μm, the tensile strength and toughness of the present steel plate is liable to decrease. Therefore, the average particle diameter of the polygonal ferrite is preferably 20 μm or less. It is more preferably 15 μm or less.

In the present embodiment, the metal structure means a metal structure in a region having a width of 0.5 mm in both the thickness directions from a reference point when using a point defined as a point ¼ of the thickness in the thickness direction from the outer surface in the base material part of the steel pipe as the reference point. In addition, the base material part means a part of a steel pipe rotated by 90° C. in the C-direction from the weld zone.

In the above region of the steel pipe, by forming a metal structure of polygonal ferrite: 10 area % or less and balance: bainitic ferrite, in the present electric resistance welded steel pipe, the above mechanical properties (L-direction tensile strength: greater than 725 MPa, L-direction yield strength: 655 to 758 MPa, C-direction Charpy absorbed energy at 0° C.: 22J or more) are realized.

Here, the area % means the area % when observed by optical microscope observation. The average particle diameter of the polygonal ferrite is obtained by image processing of the image observed with an optical microscope and finding the circle equivalent average particle diameter from the area and the total number of the polygonal ferrite.

In the present steel pipe, the reason why a specific metal structure is constantly formed and in turn the desired mechanical properties are realized by limiting the chemical composition (3 Mo %+Ni %: more than 1.00 or 3 Mo+Ni %+Cu %: 1.20%) is as follows:

The strength of the present steel plate is mainly obtained by precipitation strengthening by carbides of Mo precipitated while isothermally holding the steel at the time of coiling in addition to the strength of the bainitic ferrite.

The precipitation strengthening of Mo is manifested with peak of the isothermal holding at about 650° C. However, if coiling at 650° C., it becomes difficult to start transformation at a cooling rate exceeding 5° C./sec at which no polygonal ferrite is formed.

Therefore, it is necessary to suitably raise the hardenability in order to steadily obtain a structure mainly comprised of bainitic ferrite while avoiding the formation of polygonal ferrite as much as possible. On the other hand, since the precipitation of Mo reduces the toughness of the steel plate, it is necessary to keep the use of Mo to the minimum necessary.

From the above viewpoints, if adding the hardenability improving elements Mo, Ni, and Cu under conditions of (3 Mo %+Ni %): more than 1.00% or conditions of (3 Mo+Ni %+Cu %): more than 1.20%, it is possible to prevent formation of polygonal ferrite as much as possible. As a result, it is possible to utilize the precipitation strengthening of Mo within a range not impairing the toughness of the steel plate to obtain the target tensile strength.

In the case of forming the steel plate to produce a steel pipe, the steel plate in the forming process work hardens and the strength of the steel pipe after formation increases. The rise in strength due to work hardening fluctuates depending on the formability and processability of the steel plate, so is not determined unconditionally, but in the steel pipe after formation, in order to ensure the required mechanical properties, it is necessary to produce the steel plate considering the rise in the strength due to the work hardening.

Method of Producing Steel Plate for High Strength Electric Resistance Welded Steel Pipe use and Method of Producing High-Strength Electric Resistance Welded Steel Pipe Next, the method of producing steel plate for high strength electric resistance welded steel pipe use according to the present embodiment (below, sometimes simply referred to as "method of producing present steel plate") and the method of producing high strength electric resistance welded steel pipe according to the present embodiment (below, sometimes simply referred to as "method of producing present electric resistance welded steel pipe") will be explained.

Method of Producing Present Steel Plate

The method producing the present steel plate comprises hot rolling hot-rolled steel plate having a chemical composition of the above-mentioned present electric resistance welded steel pipe (specific composition) at 790° C. or higher, cooling it at an average cooling rate of 8 to 15° C./sec, and coiling it at 550 to 630° C. and cooling the hot-rolled steel plate at a cooling rate exceeding 5° C./sec at the beginning of transformation.

In the method of producing the present steel plate, due to the combined actions and effects derived from the hot rolling temperature, average cooling rate, coiling temperature, and cooling rate, the metal structure of the present steel plate becomes polygonal ferrite: 10 area % or less and balance: bainitic ferrite.

The hot rolled steel plate used is made a hot rolled steel plate obtained by hot rolling a slab obtained by casting molten steel of the above specific composition by a conventional casting method (preferably continuous casting method). Note that, the slab may be directly used for hot rolling as is after casting or may be cooled once, then again heated to a predetermined temperature and used for hot rolling. The heating temperature of the slab is preferably 1150 to 1300° C.

The hot rolling conditions may be normal hot rolling conditions, but if the hot rolling finishing temperature is lower than 790° C., the rolling load is excessively increased, the hot rolling becomes difficult, and the productivity is lowered, so the hot rolling finishing temperature is made 790° C. or higher. Preferably, it is 800° C. or more.

For the cumulative rolling reduction rate in the hot rolling, when controlling the cooling rate at the time of start of transformation in subsequent cooling to reliably obtain a predetermined metal structure, it is preferable to make the cumulative rolling reduction rate at 950° C. or less 50% or more.

With hot rolling in a temperature range exceeding 950° C., the austenite recrystallizes, so if the rolling reduction rate in a temperature region exceeding 950° C. is high, the dislocation density in the austenite phase at the time of the end of hot rolling becomes small and a predetermined metal structure becomes difficult to obtain.

When the cumulative rolling reduction rate at 950° C. or less is less than 50%, the particle size of the bainitic ferrite is coarsened and the toughness is made to fall. Not only that, when polygonal ferrite is precipitated, it becomes difficult to make the average particle size 20 μm or less. More preferably, the cumulative rolling reduction rate at 950° C. or less is 65% or more.

After hot rolling was finished, the hot rolled steel plate was cooled on a ROT (run out table) and coiled at 500 to 630° C. Until coiling the hot rolled steel plate, the hot rolled steel plate was cooled at an average cooling rate of 8 to 15° C./sec. During the cooling, at the time the metal structure of the hot rolled steel plate starts to transform, the hot rolled steel plate is cooled at a more than 5° C./sec cooling rate.

The coiling temperature of the hot rolled steel plate is made 500 to 630° C. If the coiling temperature is below 500° C., the tensile strength of the steel plate excessively rises and coiling becomes difficult, so the coiling temperature is made 500° C. or higher. Preferably, it is 550° C. or more. On the other hand, if the coiling temperature is more than 630° C., making the cooling rate at the start of the transformation 5° C./sec or more becomes difficult and coarse polygonal ferrite is formed, so the coiling temperature is made 630° C. or less. It is preferably 610° C. or less.

The average cooling rate until coiling the hot rolled steel plate is made 8 to 15° C./sec. If the average cooling rate is less than 8° C./sec, it becomes difficult to make the cooling rate at the start of the transformation to 5° C./sec or more, so the average cooling rate is made 8° C./sec or more. Preferably, it is 10° C./sec or more.

On the other hand, if the average cooling rate exceeds 15° C./sec, the coiling temperature becomes less than 500° C. and the strength of the steel plate excessively rises so coiling becomes difficult. Not only that, formation of the pipe is liable to become difficult, so the average cooling rate of the hot rolled steel plate is made 15° C./sec or less. Preferably, it is 13° C./sec or less.

Note that, if cooling the hot rolled steel plate at an average cooling rate of 8 to 15° C./sec until coiling at 500 to 630° C. after the end of hot rolling, the temperature of the hot rolled steel plate reaches the transformation start temperature (specifically, lower than 665° C.) immediately before coiling the hot rolled steel plate.

If the cooling rate at the time of start of transformation is 5° C./sec or less, polygonal ferrite is easily formed and it becomes difficult to make the polygonal ferrite an average particle size of 20 μm or less and the area rate of 10 area % or less, so the cooling rate at the time of start of transformation is made greater than 5° C./sec. Preferably it is 10° C./sec or more. If the cooling rate at the time of start of transformation is too fast, the tensile strength becomes too high, while if the average cooling rate is 15° C./sec or less, the cooling rate at the time of start of transformation will never become too fast, so the upper limit value of the cooling rate at the time of start of transformation is not limited.

When the temperature of the hot rolled steel plate has reached the transformation start temperature right before coiling, if cooling the hot rolled steel plate at a cooling rate exceeding 5° C./sec, it is possible to form the required metal structure (polygonal ferrite: 10 area % or less and balance: bainitic ferrite). The reason for this is as follows.

The transformation start temperature decreases along with the rise of the cooling rate. The transformation start temperature in the method of producing the present steel plate is about 665° C. when making the cooling rate at the time of start of transformation 5° C./sec. If the transformation start temperature falls down to 665° C., formation of polygonal ferrite is difficult. On the other hand, the present steel plate has a low amount of C, so the hardenability does not become high, so the transformation start temperature is about 665° C. even when cooling by 15° C./sec. The metal structure becomes mainly one of bainitic ferrite. Therefore, according to the method of producing the present steel plate, it is possible to form a metal structure mainly consists of bainitic ferrite and with little polygonal ferrite.

Method of Producing Present Electric Resistance Welded Steel Pipe

The present electric resistance welded steel pipe is obtained using the present steel plate, forming it into a tube by cold working, and butt welding the end parts of the steel plate by electric resistance welding. The cold working conditions are not limited to the specific working conditions. Normal working conditions can be applied. The pipe as a whole is not heat treated, but the weld zone is heated to 950 to 1050° C. at the outer surface, then after heating, is cooled at the inner surface at a cooling rate of 8° C./sec or more until a cooling stop temperature of 600 to 450° C. at the outer surface.

The heat treatment of the weld zone is generally performed by heating by high-frequency heating from the outer surface side of the steel pipe and by water cooling it from the outer surface side. When the heating temperature of the outer surface of the weld zone is less than 950° C., if the tube thickness of the steel pipe is large, sometimes it is not possible to heat down to the inner surface of the weld zone to a temperature of the $Ac_3$ point or more, so the heating temperature of the outer surface of the weld zone is made 950° C. or higher. Preferably it is 970° C. or more.

On the other hand, if the heating temperature of the outer surface of the weld zone is higher than 1050° C., the weld zone coarsens in crystal grains and the toughness falls, so the heating temperature of the outer surface of the weld zone is made 1050° C. or less. Preferably, it is 1000° C. or less. The heating time is not particularly limited.

If the cooling rate after heating is less than 8° C./sec on the inner surface of the weld zone, polygonal ferrite excessively forms at the weld zone, a metal structure mainly comprised of bainitic ferrite cannot be obtained, and the mechanical properties fall, so the cooling rate at the inner surface of the weld zone is made 8° C./sec or more. Preferably it is 15° C./sec or more.

The upper limit of the cooling rate at the inner surface of the weld zone is made the cooling rate where no upper bainite is formed. Note that, the lower limit of the cooling rate is set at the inner surface of the weld zone because the cooling is performed by water cooling from the outer surface of the weld zone and the cooling rate becomes slower the more to the inner surface side of the weld zone.

If the cooling stop temperature of the outer surface of the weld zone is higher than 600° C., it becomes difficult to obtain the required tensile strength at the weld zone, so the cooling stop temperature of the outer surface of the weld zone is made 600° C. or less. Preferably, it is 550° C. or less. On the other hand, if the cooling stop temperature of the outer surface of the weld zone is less than 450° C., the strength of the weld zone excessively increases and the toughness falls, so the cooling stop temperature of the outer surface of the weld zone is made 450° C. or higher. Preferably, it is at 480° C. or more.

By this heat treatment, in the weld zone as well, in the same way as in the base material part of the steel pipe, predetermined mechanical properties (L-direction tensile strength: 725 MPa greater, L-direction yield strength: 655 to 758 MPa, and e, C-direction Charpy value at 0° C.: 22 J or more) can be realized.

Due to the above, when forming the present steel plate into a tube and welding it by electric resistance welding and further heat treating this to obtain the present electric resistance welded steel pipe, it is possible to secure mechanical properties similar to the base material part of the steel pipe at the weld zone. Therefore, for example, it is possible to produce high strength electric resistance welded steel pipe with a wall thickness of 15 mm or more and outer diameter of 300 mm or more suitable as oil well pipe used for conductors and surface casing at a high yield.

EXAMPLES

Next, examples of the present invention will be explained. The conditions set in the examples are illustrations of the conditions adopted for confirming the workability and effects of the present invention. The present invention is not limited to this single illustration of conditions. The present invention can employ various conditions so long as not departing from the gist of the present invention and realizing the object of the present invention.

Example 1

Molten steel of each composition of the chemical compositions 1 to 13 shown in Table 1 was continuously cast to obtain a steel slab and obtain hot rolled steel plate in accordance with the conditions of the manufacturing condition notation "a" shown in Table 2. After that, the steel plate was cold formed into a tube and the end parts of the steel plate were welded by electric resistance welding to obtain steel pipe having an outer diameter of 473 mm. Note that, the index Z in Table 1 is (3Mo %+Ni %) or (3Mo %+Ni %+Cu %).

Test pieces were sampled from the base material part of the produced steel pipe. The metal structure was observed under an optical microscope using the L-direction cross-section as an observation surface and the average particle size of the polygonal ferrite was measured. Further, the L-direction tensile strength TS of the steel pipe, the L-direction 0.5% yield strength YS of the steel pipe, and the C-direction Charpy absorbed energy at 0° C. of the base material part were measured. The results are shown in Table 3.

TABLE 1

| Notation of composition | | C | Si | Mn | P | S | Nb | V | Ti | Mo | Ni |
|---|---|---|---|---|---|---|---|---|---|---|---|
| Inv. ex. | 1 | 0.042 | 0.28 | 1.74 | 0.007 | 0.0012 | 0.072 | 0.056 | 0.015 | 0.24 | 0.23 |
| | 2 | 0.061 | 0.22 | 1.78 | 0.009 | 0.0016 | 0.070 | 0.057 | 0.015 | 0.24 | 0.22 |
| | 3 | 0.054 | 0.21 | 1.72 | 0.009 | 0.0022 | 0.048 | 0.029 | 0.015 | 0.30 | 0.21 |
| | 4 | 0.068 | 0.43 | 1.88 | 0.013 | 0.0034 | 0.033 | | 0.015 | 0.21 | 0.38 |
| | 5 | 0.043 | 0.18 | 1.54 | 0.010 | 0.0008 | 0.030 | 0.015 | 0.017 | 0.37 | 0.20 |
| | 6 | 0.041 | 0.20 | 1.68 | 0.009 | 0.0018 | 0.028 | | 0.013 | 0.32 | 0.18 |
| | 7 | 0.052 | 0.24 | 1.75 | 0.008 | 0.0010 | 0.068 | 0.055 | 0.014 | 0.33 | 0.24 |
| Comp. ex. | 8 | 0.042 | 0.28 | 1.50 | 0.007 | 0.0012 | 0.072 | 0.056 | 0.015 | 0.24 | 0.23 |
| | 9 | 0.061 | 0.22 | 1.78 | 0.009 | 0.0016 | 0.070 | 0.057 | 0.015 | 0.21 | 0.15 |
| | 10 | 0.082 | 0.21 | 1.95 | 0.009 | 0.0022 | 0.075 | 0.056 | 0.015 | 0.38 | 0.25 |
| | 11 | 0.041 | 0.21 | 1.63 | 0.008 | 0.0008 | 0.015 | 0.015 | 0.015 | 0.24 | 0.12 |
| | 12 | 0.070 | 0.20 | 1.72 | 0.010 | 0.0038 | 0.065 | 0.015 | 0.014 | 0.15 | 0.40 |
| | 13 | 0.067 | 0.21 | 1.64 | 0.011 | 0.0024 | 0.038 | 0.025 | 0.002 | 0.29 | 0.05 |

| Notation of composition | | Cu | Al | N | O | Ca | Cr | REM | Z |
|---|---|---|---|---|---|---|---|---|---|
| Inv. ex. | 1 | 0.26 | 0.026 | 0.0033 | 0.0010 | 0.0019 | 0.18 | | 1.22 |
| | 2 | 0.22 | 0.023 | 0.0046 | 0.0013 | 0.0020 | 0.20 | | 1.17 |
| | 3 | 0.22 | 0.022 | 0.0042 | 0.0015 | 0.0018 | | | 1.33 |
| | 4 | 0.42 | 0.020 | 0.0028 | 0.0011 | | | | 1.43 |
| | 5 | 0.20 | 0.023 | 0.0032 | 0.0018 | 0.0013 | 0.48 | 0.0018 | 1.51 |
| | 6 | 0.18 | 0.021 | 0.0018 | 0.0009 | 0.0017 | 0.21 | | 1.32 |
| | 7 | | 0.020 | 0.0034 | 0.0011 | 0.0022 | 0.17 | | 1.23 |
| Comp. ex. | 8 | 0.26 | 0.026 | 0.0033 | 0.0010 | 0.0019 | | | 1.22 |
| | 9 | 0.15 | 0.023 | 0.0046 | 0.0013 | 0.0020 | 0.20 | | 0.93 |
| | 10 | 0.24 | 0.022 | 0.0042 | 0.0015 | 0.0018 | 0.48 | | 1.63 |
| | 11 | 0.13 | 0.020 | 0.0015 | 0.0011 | 0.0032 | | | 0.97 |
| | 12 | 0.40 | 0.022 | 0.0032 | 0.0014 | | | | 1.25 |
| | 13 | 0.05 | 0.028 | 0.0041 | 0.0018 | | | | 0.97 |

TABLE 2

| Notation of manufacturing conditions | | Heating temperature (° C.) | Cumulative rolling reduction rate at 950° C. or less | Hot rolling end temperature (° C.) | Average cooling rate until coiling (° C./sec) | Transformation temperature (° C.) | Cooling rate at time of transformation start (° C./sec) | Coiling temperature (° C.) | Plate thickness (mm) | Heating temperature of outer surface of weld zone (° C.) | Cooling rate of inner surface of weld zone (° C./sec) | Cooling stop temperature of outer surface of weld zone (° C.) |
|---|---|---|---|---|---|---|---|---|---|---|---|---|
| Inv. ex. | a | 1230 | 72 | 810 | 12 | 654 | 10 | 565 | 15 | 990 | 10 | 500 |
| | b | 1230 | 67 | 810 | 10 | 656 | 8 | 580 | 15 | 990 | 10 | 500 |
| | c | 1150 | 53 | 810 | 8 | 662 | 5.5 | 610 | 17 | 990 | 10 | 500 |
| | d | 1210 | 65 | 810 | 9 | 658 | 7 | 590 | 17 | 990 | 10 | 500 |
| | e | 1180 | 65 | 800 | 9 | 659 | 7 | 615 | 19.5 | 1000 | 8 | 500 |
| | f | 1180 | 65 | 800 | 8 | 665 | 5 | 620 | 20 | 1000 | 8 | 500 |
| Comp. ex. | g | 1230 | 45 | 810 | 8 | 661 | 6 | 620 | 17 | 990 | 10 | 500 |
| | h | 1230 | 67 | 810 | 6 | 690 | 4 | 640 | 15 | 990 | 10 | 500 |
| | i | 1150 | 53 | 780 | 18 | 648 | 16 | 490 | 15 | 990 | 10 | 500 |
| | j | 1230 | 67 | 810 | 10 | 656 | 8 | 580 | 15 | 1100 | 12 | 575 |
| | k | 1180 | 65 | 800 | 6 | 688 | 4 | 630 | 22 | 1000 | 8 | 500 |

TABLE 3

| Notation of manufacturing conditions | Notation of composition | Metal structure Polygonal ferrite of base material | | Weld zone | L-direction TS (N/mm$^2$) | L-direction 0.5% YS (N/mm$^2$) | C-direction Charpy absorbed energy at 0° C. (base material part) | |
|---|---|---|---|---|---|---|---|---|
| | | Area % | Average particle size (μm) | | | | | |
| a | 1 | 4 | 5 | BF | 773 | 702 | 150 | Inv. |
| | 2 | 1 | 2 | | 770 | 699 | 140 | ex. |
| | 3 | 7 | 16 | | 793 | 721 | 150 | |
| | 4 | 0 | 1 | | 773 | 705 | 130 | |
| | 5 | 3 | 4 | | 777 | 709 | 170 | |
| | 6 | 6 | 9 | | 779 | 711 | 150 | |
| | 7 | 1 | 2 | | 768 | 696 | 145 | |
| | 8 | 41 | 32 | PF + BF | 662 | 601 | 85 | Comp. |
| | 9 | 11 | 22 | | 722 | 658 | 105 | ex. |
| | 10 | 0 | 0 | BF | 846 | 768 | 85 | |
| | 11 | 35 | 28 | PF + BF | 684 | 623 | 90 | |
| | 12 | 14 | 21 | | 713 | 648 | 100 | |
| | 13 | 23 | 25 | | 698 | 632 | 85 | |

(Note)
BF: bainitic ferrite,
PF: polygonal ferrite

Further, FIG. 1 shows the tensile strength TS and the yield strength YS in the L-direction of the steel pipe produced along each of the production conditions in Table 2. Note that, in FIG. 1, the square symbols listed in the box of the present invention show examples, while the x mark symbols outside of the box of the present invention show comparison examples. According to FIG. 1, in the present electric resistance welded steel pipe, a tensile strength of more than 725 MPa and a yield strength of 655 to 758 MPa can be obtained.

Example 2

The molten steel of the chemical composition 1 shown in Table 1 was continuously cast to obtain a steel slab and obtain a hot rolled steel plate in accordance with the conditions of each of the production conditions "a" to "k" shown in Table 2. The steel plate was cold worked into a tube during subsequent cooling, while the end parts of the steel plates were welded by electric resistance welding to obtain steel pipe having an outer diameter of 473 mm.

Test pieces were sampled from the base metal part and weld zone of the produced steel pipe and examined for metal structure under an optical microscope using the L-direction cross-section as an observation surface and measured for average particle size of polygonal ferrite. Further, the L-direction of the tensile strength TS of the steel pipe, 0.5% yield strength YS of L-direction of the steel pipe, and C-direction Charpy absorbed energy (J) at 0° C. for each of the base metal part and weld zone were measured. The results are shown in Table 4. The tensile test was carried out along ASTM A370, and the Charpy absorbed energy was measured along ASTM A370 and ASTM E23.

TABLE 4

| Notation of composition | Notation of manufacturing conditions | Metal structure Polygonal ferrite of base material | | Weld zone | L-direction TS (N/mm$^2$) | L-direction 0.5% YS (N/mm$^2$) | C-direction Charpy absorbed energy at 0° C. (base material part) | Charpy absorbed energy of electric resistance weld zone at 0° C. (weld zone) | |
|---|---|---|---|---|---|---|---|---|---|
| | | Area % | Average particle size (μm) | | | | | | |
| 1 | a | 4 | 5 | BF | 773 | 702 | 150 | 150 | Inv. |
| | b | 5 | 10 | | 768 | 698 | 140 | 150 | ex. |
| | c | 9 | 12 | | 735 | 666 | 150 | 150 | |
| | d | 5 | 8 | | 761 | 694 | 130 | 150 | |
| | e | 5 | 9 | | 752 | 687 | 135 | 130 | |
| | f | 10 | 21 | | 726 | 658 | 75 | 130 | |
| | g | 15 | 25 | | 712 | 648 | 95 | 150 | Comp. |
| | h | 50 | 40 | | 624 | 567 | 85 | 150 | ex. |
| | i | 0 | 0 | | 832 | 761 | 145 | 150 | |
| | j | 5 | 10 | UB | 768 | 698 | 140 | 20 | |
| | k | 40 | 30 | BF | 654 | 592 | 80 | 130 | |

(Note)
BF: bainitic ferrite,
UB: upper bainite

Figure 2:
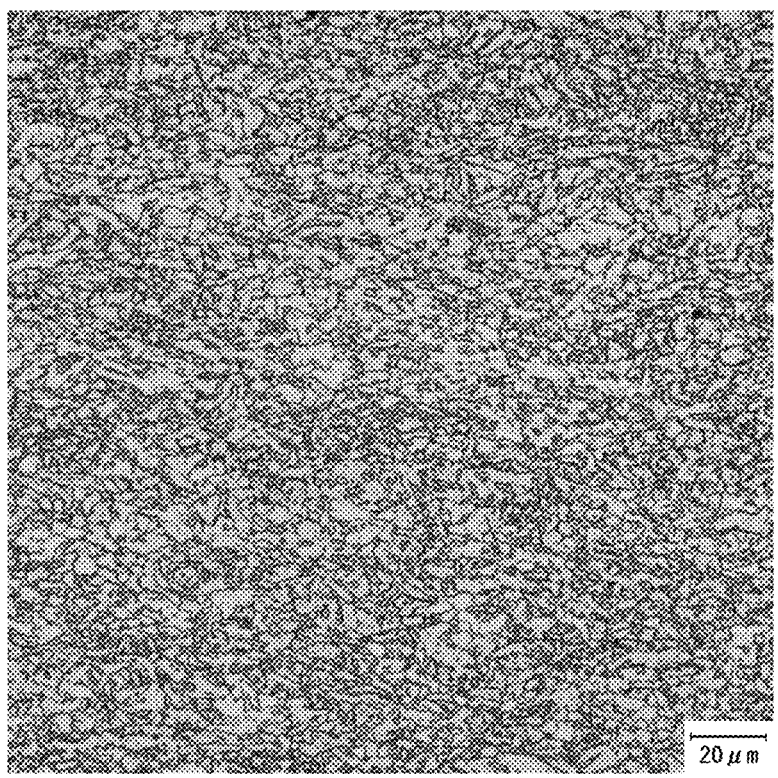
FIG. 2 is a photograph showing an example of a metal structure of a high strength steel pipe according to the present invention.

Further, FIG. 2 shows the metal structure of the present electric resistance welded steel pipe produced along the manufacturing conditions "a" in Table 4. According to FIG. 2, it is learned that in the present electric resistance welded steel pipe, a metal structure consists of polygonal ferrite: 10 area % or less and a balance of bainitic ferrite is obtained.

The invention claimed is:

1. High strength electric resistance welded steel pipe characterized by having a chemical composition consisting of, by mass %,
   C: 0.040 to 0.070%,
   Si: 0.10 to 0.50%,
   Mn: 1.60 to 2.00%,
   Nb: 0.020 to 0.080%,
   V: 0.060% or less,
   Ti: 0.010 to 0.025%,
   Mo: 0.20 to 0.40%,
   Ni: 0.10 to 0.50%,
   Al: 0.050% or less,
   3 Mo %+Ni %: more than 1.00%, and
   a balance of Fe and unavoidable impurities,
   optionally P: 0.030% or less, S: 0.004% or less, N: 0.006% or less, O: 0.004% or less, Cu: 0.10 to 0.50%, Cr: 0.05to 0.50%, Ca: 0.0005 to 0.0040% and REM: 0.0005 to 0.0050%, and wherein
   when using a point defined as a point ¼ of the thickness in the thickness direction from the surface in the base material part of the steel pipe as a reference point, the metal structure in a region having a width of 0.5 mm in both the thickness directions from the reference point as a center consists of polygonal ferrite: 10 area % or less and a balance of bainitic ferrite, and
   a thickness is 15.0 to 19.8 mm, and wherein the mechanical properties of the metal structure are such that the tensile strength in the axial direction exceeds 725 MPa, the yield strength in the axial direction is from 655 to 758 MPa, and the Charpy absorbed energy in the circumferential direction at 0° C. is 22 J or more.

2. The high strength electric resistance welded steel pipe according to claim 1, wherein the polygonal ferrite has an average particle diameter of 20 μm or less.

3. The high strength electric resistance welded steel pipe according to claim 1, wherein (3Mo %+Ni %+Cu %) is more than 1.20%.

4. The high strength electric resistance welded steel pipe according claim 3, wherein the polygonal ferrite has an average particle diameter of 20 μm or less.

5. A method of producing the high strength electric resistance welded steel pipe according to claim 1, comprising:
   hot rolling at 790° C. or more a hot-rolled steel plate having a chemical composition consisting of, by mass %,
   C: 0.040 to 0.070%,
   Si: 0.10 to 0.50%,
   Mn: 1.60 to 2.00%,
   Nb: 0.020 to 0.080%,
   V: 0.060% or less,
   Ti: 0.010 to 0.025%,
   Mo: 0.20 to 0.40%,
   Ni: 0.10 to 0.50%,
   Al: 0.050% or less,
   3 Mo %+Ni %: more than 1.00%, and
   a balance of Fe and unavoidable impurities,
   optionally P: 0.030% or less, S: 0.004% or less, N: 0.006% or less, O: 0.004% or less, Cu: 0.10 to 0.50%, Cr: 0.05 to 0.50%, Ca: 0.0005 to 0.0040% and REM: 0.0005 to 0.0050%
   cooling the steel plate at an average cooling rate of 8 to 15° C./sec,
   coiling the steel plate at 500 to 630° C.,
   cooling the steel plate at a cooling rate exceeding 5° C./sec at the beginning of transformation,
   forming the steel plate into a tube,
   welding end portions of the steel plate by electric resistance welding,
   heating the outer surface of the weld zone to 950 to 1050° C., and cooling the inner surface of the weld zone at a cooling rate of 8° C./sec or more to a cooling stop temperature of the outer surface of 600 to 450° C. to obtain the high strength electric resistance welded steel pipe.

6. The method for producing the high strength electric resistance welded steel pipe according to claim 5, wherein the temperature at the start of the transformation is less than 665° C.

7. The method for producing the high strength electric resistance welded steel pipe according to claim 5, wherein the hot-rolled steel plate is hot-rolled steel plate obtained by heating a slab and hot rolling it with a cumulative rolling reduction rate at 950° C. or less of 50% or more.

* * * * *